US012250216B2

(12) United States Patent
Dao et al.

(10) Patent No.: US 12,250,216 B2
(45) Date of Patent: Mar. 11, 2025

(54) METHOD FOR AUTHENTICATING A USER AT A USER EQUIPMENT

(71) Applicant: THALES DIS FRANCE SAS, Meudon (FR)

(72) Inventors: Frédéric Dao, Gemenos (FR); Thomas Dandelot, Gemenos (FR); Frédéric Paillart, Gemenos (FR); Frédéric Faure, Gemenos (FR); Fabrice Delhoste, Gemenos (FR)

(73) Assignee: THALES DIS FRANCE SAS, Meudon (FR)

( * ) Notice: Subject to any disclaimer, the term of this patent is extended or adjusted under 35 U.S.C. 154(b) by 1051 days.

(21) Appl. No.: 17/042,025

(22) PCT Filed: Mar. 15, 2019

(86) PCT No.: PCT/EP2019/056606
§ 371 (c)(1),
(2) Date: Sep. 25, 2020

(87) PCT Pub. No.: WO2019/185373
PCT Pub. Date: Oct. 3, 2019

(65) Prior Publication Data
US 2021/0168141 A1 Jun. 3, 2021

(30) Foreign Application Priority Data
Mar. 27, 2018 (EP) .................................... 18305337

(51) Int. Cl.
*H04L 29/00* (2006.01)
*G06N 20/00* (2019.01)
(Continued)

(52) U.S. Cl.
CPC ......... *H04L 63/0884* (2013.01); *G06N 20/00* (2019.01); *G07C 9/22* (2020.01);
(Continued)

(58) Field of Classification Search
CPC ...... H04L 63/0884; G06N 20/00; G07C 9/22; H04W 12/06; H04W 12/30; H04W 12/63;
(Continued)

(56) References Cited

U.S. PATENT DOCUMENTS 9,510,204 B2 * 11/2016 Haro ..................... H04W 4/029
9,554,279 B1 * 1/2017 Kremer ................. H04W 4/029
(Continued)

FOREIGN PATENT DOCUMENTS

EP 2928152 A2 10/2015
WO 2017005231 A1 1/2017

OTHER PUBLICATIONS

International Search Report (PCT/ISA/210) mailed on Jul. 31, 2019, by the European Patent Office as the International Searching Authority for International Application No. PCT/EP2019/056606.
(Continued)

*Primary Examiner* — Ghazal B Shehni

(57) ABSTRACT

The present invention relates to a method for authentication of a user using a user equipment, comprising an authentication engine for authenticating at least one user, said authentication engine being configured to operate with a local authentication model, wherein the method comprises the step for the user equipment of enhancing its local authentication model by at least one authentication factor, wherein said at least one authentication factor is stored in the local authentication model with a validity indication, indicating the time the authentication factor is valid for taking into account by the authentication engine, and authenticating a user by means of a match of the local authentication model with a set of user behavior indications retrieved by the user equipment through the authentication engine.

11 Claims, 4 Drawing Sheets

(51) Int. Cl.
 *G07C 9/22* (2020.01)
 *H04L 9/40* (2022.01)
 *H04W 12/06* (2021.01)
 *H04W 12/30* (2021.01)
 *H04W 12/63* (2021.01)

(52) U.S. Cl.
 CPC ............ *H04W 12/06* (2013.01); *H04W 12/30* (2021.01); *H04W 12/63* (2021.01)

(58) Field of Classification Search
 CPC ..... H04W 12/61; H04W 12/68; H04W 88/02; G06F 21/316
 See application file for complete search history.

(56) References Cited

U.S. PATENT DOCUMENTS

| 2011/0202466 | A1* | 8/2011 | Carter | H04W 4/023 |
| | | | | 705/67 |
| 2016/0050308 | A1* | 2/2016 | Liu | H04W 4/00 |
| | | | | 455/411 |
| 2017/0230363 | A1* | 8/2017 | Deutschmann | H04W 12/065 |
| 2018/0198614 | A1* | 7/2018 | Neumann | H04W 12/126 |
| 2019/0061687 | A1* | 2/2019 | Khalil | B60R 25/2072 |

OTHER PUBLICATIONS

Written Opinion (PCT/ISA/237) mailed on Jul. 31, 2019, by the European Patent Office as the International Searching Authority for International Application No. PCT/EP2019/056606.

\* cited by examiner

METHOD FOR AUTHENTICATING A USER AT A USER EQUIPMENT

FIELD OF THE INVENTION

The present invention relates to a method for authentication of a user at a user equipment by means of a machine learning based system. The invention also pertains to a user equipment for using said method. The invention further relates to a central server for using the method. The invention further relates to a system for using the method.

BACKGROUND OF THE INVENTION

Today a growing amount of tasks for which in earlier times human interaction was needed are today fulfilled by automatized system, thanks to so-called artificial intelligence methods, mainly subsumed under "machine learning" or "knowledge based" systems. Such knowledge based systems comprise at least a machine learning model resp. database which is trained with many input data.

One of the use cases for applying knowledge based systems is the authentication of users resp. user equipments. E.g. for accessing the mobile phone or other device of a user it requires by now the typical input, like login/password, special keys etc. All known systems are prone of fraudsters, which shall be blocked or at least somehow be detectable at the device, with certain known measures. Such measures have in common that even the eligible user gets more and more impacted by higher security measures. The application of knowledge based system for such use case however is currently discussed. However it has some drawbacks as the identified authentication factors considered by the knowledge base systems might be subject of being changed over time, or only temporary valid. Such situation might occur, when a user who is identified by the way he walks, gets a cast due to an injury at the legs. Such situation is by now not addressed by known systems.

Additionally for a plurality of devices owned by a user a separate authentication system needs to be created, although the same user resp. user group is accessing such user equipments. This affects the user acceptance of such systems.

It is therefore the goal of present invention to overcome the mentioned disadvantages and to propose a solution for an improved authentication of users at least one user equipment.

Further alternative and advantageous solutions would, accordingly, be desirable in the art.

SUMMARY OF THE INVENTION

For this it is according to a first aspect of the invention suggested a method for authentication of a user using a user equipment according to claim 1. It is further suggested according to a second aspect of the invention a user equipment according to claim 8. It is further proposed a central server according to claim 8.

According to a first aspect of the invention it is proposed a method for authentication of a user using a user equipment, comprising an authentication engine for authenticating at least one user, said authentication engine being configured to operate with a local authentication model, wherein the method comprises the step for the user equipment of enhancing its local authentication model by at least one authentication factor, wherein said at least one authentication factor is stored in the local authentication model with a validity indication, indicating the time the authentication factor is valid for taking into account by the authentication engine, and authenticating a user by means of a match of the local authentication model with a set of user behavior indications retrieved by the user equipment through the authentication engine.

The invention relates to a user equipment configured to be used by a human user. It is in particular capable of carrying out communication tasks, like a smartphone, either via cellular or any other wireless or wired communication channel.

The user equipment is configured to have means for carrying out an authentication of the human user, in order to disallow access by non-eligible persons. In particular the authentication is limited to one human user.

The user equipment comprises at least a local memory unit and processing circuitry at least for carrying out the authentication procedure and related measures. Further communication circuitry, in particular a receiver/transceiver circuitry is preferably part of the user equipment.

The user equipment comprises a local authentication model, stored in the local memory unit. Such an local authentication model is in particular a database or any other access optimized data structure, where information about the user is stored. Such local authentication model is in particular a knowledge base for machine learning based decision making.

Further the user equipment comprises at least one authentication engine. Such an authentication engine is configured to determine, in particular based on machine learning methods, based on a knowledge base and input data a decision or response for said input data. The decision resp. response in the case of said user equipment relates to the eligibility of the current user to access said user equipment.

The local authentication model comprises at least one authentication factor, which relates to one information unit that is usable for carrying out the authentication tasks of the authentication engine.

The user equipment is configured to ascertain at least one user behavior indication, which is user related data, that relate to the user behavior in particular in conjunction with the use of the user equipment. By means of said at least one behavior indication as input parameter the authentication engine is configured to carry out its decision task if the user is eligible for accessing the user equipment.

This approach is advantageous as it reliefs the user from memorizing and entering passwords, PINs, or any touch gestures for unlocking the user equipment.

User behavior might be the way a user walks, how he holds the user equipment, keyboard typing, touch screen usage, heartbeat, blood pressure, Wi-Fi Hotspot usage (which hotspot, data exchange behavior), the location (e.g. by a GNSS like GPS, Glonass, or by a cell tower . . . ), and much more biometric or non-biometric factors.

The inventive method additionally has the advantage that it is able to detect that the human user has a temporary modification of its behavior. That may be due to an injury or any other reasons, like situational e.g. when on vacation, time-based, e.g. during weekends etc.

For handling such kind of matter, the inventive method suggests that with at least one authentication factor a validity indication is stored in the local database. With this validity indication a timewise validity limitation—a so called validity period—is established which needs to be taken into account by the authentication engine.

This leads to an ephemeral machine learning model, and allows for having such flexibility in terms of time of usage.

Preferably such validation indication is stored with one or more authentication factor with the local authentication model. However there will be preferably at least one other authentication factor which is not time-barred at the same time. For this preferably no validity indication is stored, or at least one validity indication which indicates everlasting validity of the authentication factor.

According to a preferred embodiment wherein said validity indication is derived from at least one out of:
- a user input,
- a predefined default value,
- context derivation.

A context derivation may be related to the special time, e.g. during weekends, in the night, on public holidays etc., or in dependence of the detected type of temporary alternation of a specific authentication factor.

Preferably a derived validity indication relates to an authentication factor which is equipped with a duration estimation.

The user input may come from an one time occurrences, e.g. an answered question like what do you eat today? Later-on this might be a valid user behavior indication.

According to another preferably embodiment of the invention it is proposed that after expiry of a predefined period the step of
- searching at least one authentication factor with expired validity indication in the local authentication model,
- removing the at least one found authentication factor from the local authentication model.

This embodiment relates to the handling of authentication factors with a validity indication when the validity indication, that is the validity period which is indicated by the validity indication has expired. Preferably this authentication factor is then simply ignored.

Alternatively or additionally authentication factors with an expired validity period are removed from the local authentication model. This is preferably done by a separate cleanup process, which is carried out in particular as a background process regularly.

As one alternative embodiment the validity indications are stored separately in a dynamic model, and with the regular cleanup process triggered after a given period, it is checked which ephemeral authentication factors have now an active validity period, and which have not, that is where the validity period has expired. This is then transferred to the local authentication model by delete or insert operations for the respective authentication factor information of the local authentication model.

It needs to be noted that authentication factors with recurring validity periods are preferably not deleted, when expired for one time. E.g. an authentication factor valid on Sundays is therefore not to be removed when it is detected on Monday, that it is expired.

Additionally it is in particular to decide in case of contrary authentication factors, wherein at least one is equipped with a validity indication, how to cope with such a situation. Preferably in case only one validity indication is available, the authentication factor with validity indication is preferred compared to the one without. This considers the fact that the authentication factor with validity period may be introduced later to the local authentication model, and is meant to overrule the "general" situation of the not time-barred authentication factor, but only for the time indicated by the validity period.

In case of other reliability factors considered by the authentication engine, at least a modification in the described sense of how to take such authentication factors into consideration for an authentication decision.

In a further advantageous embodiment it is proposed that the authentication engine comprises a plurality of machine learning patterns, comprising in authenticated mode an active machine learning pattern for collecting authentication factors relating to a user interaction, and a passive machine learning pattern for collecting authentication factors by retrieving information through sensors of the user equipment.

Generally each machine learning based system also requires a way to train the system in order to enhance the machine learning model on the dedicated purpose. Different training variants are existing, in particular supervised training compared to non-supervised training.

This is also required for the local authentication model of the user equipment of this inventive method. For doing so according to this embodiment it is proposed to apply at least two machine learning patterns: the active learning pattern and the passive learning pattern.

The passive learning pattern relates to learning without active user interaction. That means the user does not detect that he is currently training the local authentication model. Such training may be the way the user is walking, he is handling the user equipment, or when it comprises a positioning unit, like a GPS to detect where the user is just taking the user equipment to. Hence such passive learning is taking into account information in particular through sensors of the user equipment, like GPS, gyro, an inertial sensor, compass, microphone, touch screen, as well as communication circuitry like Wi-Fi, cellular, Bluetooth, NFC etc. Also a connection to an external device like a connected smart watch, fitness tracker, so the walking speed, fitness results etc. are also preferably taken into account.

In contrast the active learning mode relates to user input into the user equipment. This may relate to questions entered on the user equipment, or any other input which leads to a user interaction.

Preferably by applying both learning patterns comprise that first the user is authenticated—e.g. by conventional means or already by the by authentication engine with the by then existing local authentication model—and then the following behavior input is used for applying the learning patterns. Any passive or active usage of the user equipment by the user will then be applied to the local authentication model as criteria for identifying this very user.

According to a preferred embodiment said at least one authentication factor comprises at least one out of:
- one of the latest user equipment used by the user,
- one of the last location the user was situated at,
- one of the last persons the user interacted with,
- recently determined data retrieved by at least one sensor accessible by the user equipment,
- an answer to a question provided through the user equipment.

This embodiment presents alternative authentication factors that are entered into the local authentication model by way of training, and that are considered for carrying out the authentication of the user for getting access to the user equipment.

It can be seen that such authentication factors cover both factors ascertained by way of passive and active learning pattern.

It is further according to another advantageous embodiment suggested that the validity indication of said at least one authentication factor is amended in case a second authentication factor impacting the first authentication factor is determined.

This embodiment refers to a special case of overwriting a previous authentication factor, even if equipped with a validity indication indicating a validity period. This may happen in particular due to the fact that a behavioral change of the user is taking place. This might be due to an incident like when the user has an injury. Then the authentication factor of how the user is walking gets invalid, at least temporary. Preferably a background information, in particular through user input, that means as part of the active learning pattern, would help streamlining the local authentication model in such a situation. The background information is then represented as the second authentication factor, which impacts the first authentication factor relating to how the user walks.

Consequently for a given, entered or estimated validity period another behavior pattern relating how the user walks is valid than it was before.

This example shows, how flexible the inventive method is designed in order to react timely and but not for eternity in case of changes in regards of the user. Furthermore it is encompassed by this embodiment that a once identified dynamic, that means validity period based authentication factor stays for longer. This is in particular the case when an estimated validation period turns out to be too short, and will be extended. When that happens a predetermined number of times, then the authentication factor becomes static. This situation is preferably evaluated regularly and represented in the local authentication model accordingly.

This embodiment is in particular useful for a change of user behavior e.g. the way a user walks as a result from an injury. Normally the injury will be healed after certain time, but in rare cases it can also happen, that the handicap of the affected user remains. Then a static change of the local authentication model, without further validity indication is useful and advantageous.

In another preferred embodiment it is proposed that the user equipment further comprising a communication unit for communicating with a central server comprising a central authentication model used for said authentication engine, providing a first model update message relating to said at least one authentication factor of the local authentication model to the central server, being configured to update the central authentication model based on said first model update message, retrieving a second model update message from the central server, relating to an update of the central authentication model, said update relating to at least one model update message provided by at least one second user equipment, and enhancing the local authentication model based on the second model update message.

This embodiment relates to an additional option in regards of user authentication, which relates to the propagation of the authentication on other user equipments in possession of the respective user. This embodiment is supposed to solve the task that when the user uses more than one user equipment, but wants to benefit from the machine learning based authentication not only on one user equipment. So the user may get access to all those user equipment based on the same authentication method according to the inventive method.

For doing so it is proposed a method wherein the two or more user equipments are equipped with communication circuitry for accessing by such communication means a central server. This may happen through Wi-Fi, cellular or any other communication means. Advantageously it is for each of the participating user equipments possible to use a different communication channel resp. carrier in order to reach the central server. Preferably a secured internet connection is used for the access to the central server.

The central server has stored a central authentication model, which is preferably composed alike the local authentication models, that is a database or any other access optimized data structure.

When a user equipment carries out an amendment of the local authentication model, e.g. by ascertaining a type of authentication factor, then according to this embodiment it will send a first model update message to the central server. This first model update message represents information relating to the amendment of the local authentication model. Preferably this also relates to amendments with regards to the validity periods of an authentication factor. The central server is then supposed to consider the first model update message in order to update the central authentication model. Preferably when this leads to a change in the central authentication model, then this triggers the central server to create a second model update message and sent it to at least one of the user equipments belonging to the user.

So at least at one of the user equipments this second model update message is received and used for updating the local authentication model with the content of the second model update message.

This leads to a distribution of the respective local authentication models among the user equipments.

Preferably the user equipment that sent the first model update message also retrieves the second model update message from the central server relating to the amendments of the central authentication model based on said first model update message. This is advantageous as by doing so the user equipment receives a confirmation that its first model update message was well received and handled by the central server. Further the central server does not have to create a separate acknowledge message for the sending user equipment, and simply sends the second model update message to all user equipments of the user.

For doing so the central server maintains a directory of user equipments belonging to the same user, and hence eligible to receive the second model update messages once a user equipment of this user sent a first model update message.

Preferably the central server is configured to handle many different users separately.

This embodiment is in particular advantageous as it allows to collect behavioral or actively entered information from the user from more user equipments, therefore in a higher intensity and a higher amount of input data for authenticating. That leads to a better reliability of authentication on the respective user equipments.

According to a second aspect of the invention it is proposed a user equipment, comprising an authentication engine for authenticating at least one user, said authentication engine being configured to operate with a local authentication model, wherein the user equipment is configured to enhance its local authentication model by at least one authentication factor, wherein said at least one authentication factor is stored in the local authentication model with a validity indication, indicating the time the authentication factor is valid for taking into account by the authentication engine, and further the user equipment is configured to authenticate a user by means of a match of the local authentication model with a set of user behavior indications retrieved by the user equipment through the authentication engine.

This aspect of the invention shares the advantages of the first aspect of the invention.

According to a third aspect of the invention it is proposed a central server for handling at least one central authentication model for at least two user equipments, configure to receive a first model update message relating to at least one authentication factor from the first user equipment, to update the central authentication model in response to receiving said first model update message, to provide a second model update message relating to said updated central authentication model to at least one second user equipment of the plurality of user equipments, for enhancing the local authentication model of said at least one second user equipment.

This aspect of the invention relates to the embodiment of the first aspect of the invention relating to propagation of authentication factors in user equipments on all user equipments of one user. It relates to the central server for maintaining a consistent authentication model among the user equipment. The centrals server is preferably equipped with receiver and transmitter circuitry for communicating wired or wirelessly with the user equipments, preferably by means of Internet based access. So the central server may then have wired access to the internet, but the user equipments are communicating wirelessly with the internet.

Further it provides a temporary memory and processing circuitry, in particular a central processing unit, for carrying out the task where the central server is configured for. In the memory at least one central authentication model is stored, which comprises authentication factors of at least one user equipment belonging to a respective user.

The central server is configured to retrieve first model update messages from at least one of the user equipments. This is internally handled and decided for updating the central authentication model.

Finally at least one, preferably all the user equipments of the user are then informed with the second model update message about the change of the central authentication model.

With this aspect it is assured that the user has a consistent local authentication model in its user equipments available and can take the same actions for getting access.

According to a fourth aspect of the invention it is proposed a system comprising a central server and a plurality of user equipments, the user equipments and the central server being communicatively connectable, wherein each of the user equipments comprises an authentication engine configured to operate with a local authentication model for authenticating at least one user, and the central server comprises a central authentication model used for said authentication engine, wherein a first user equipment of the plurality of user equipments is configured to enhance its local authentication model based on at least one authentication factor, and to provide a first model update message relating to said at least one authentication factor to the central server, the central server is configured to update the central authentication model in response to receiving said first model update message, and to provide a second model update message relating to said updated central authentication model to at least one second user equipment of the plurality of user equipments, for enhancing the local authentication model of said at least one second user equipment.

The fourth aspect shares the advantages of the third aspect.

As it is shown this invention advantageously solves the depicted problem and proposes a method and user equipment with an improved way of authenticating user access which provides a high level of usability and flexibility even when a timewise change of user behavior.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a user equipment UE of the type to which the present invention is applied as an embodiment. It represents a simple approach where the user equipment UE is equipped with an authentication engine AE, in particular based on machine learning techniques.

The user equipment is any type of device for carrying out any kind of task, including smartphones, tablets, smartwatches, music players, sport/fitness gear accessories, game consoles, smart remote controls, asset tracker, navigation devices or anything like that, where a user authentication is applicable.

The authentication engine is configured for carrying out an authentication of a user, in particular for accessing the user equipment.

The exemplifying user equipment is further equipped with a first sensor SE1 and a second sensor SE2, as well as a user interface UI. From such sensors and user interfaces an input is generated and made available to the user equipment, which is called behaviour indication BI.

Such behavioural indications are supposed to be used by machine learning engines ML1, ML2, ML3 to train the local authentication model AM. Such machine learning is in particular processed through the machine learning engines in order to create an authentication factor that is stored in local the authentication model AM.

With that local authentication model the user equipment UE is capable to carry out an authentication of the user and eventually to give the eligible user access to the user equipment, e.g. by unlocking the user interface UI screen. Preferably the user equipment resp. its local authentication model is trained by user behaviour every time, the user is already successfully authenticated. In the first days of usage this requires preferably a common authentication method, e.g. PIN or password entering, biometric authentication or the like. When this is done, the local authentication model is enhanced by considering the user behaviour. When the local authentication model is mature enough, then through user behaviour alone, without the common methods mentioned above, the user gets access to the user equipment again.

Figure 1:
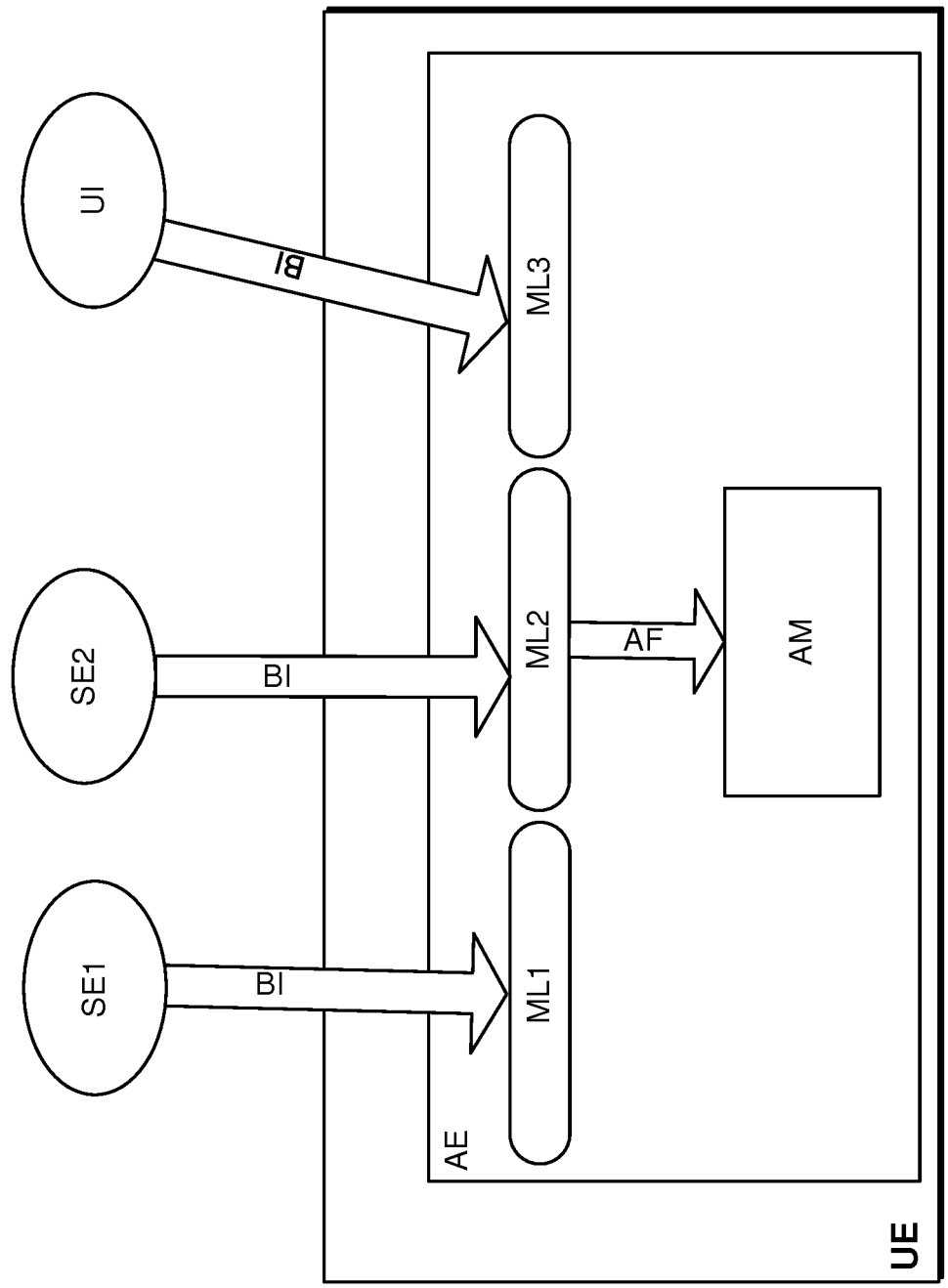
FIG. 1 represents a user equipment of the type to which the present invention is applied to as an embodiment.
Figure 2:
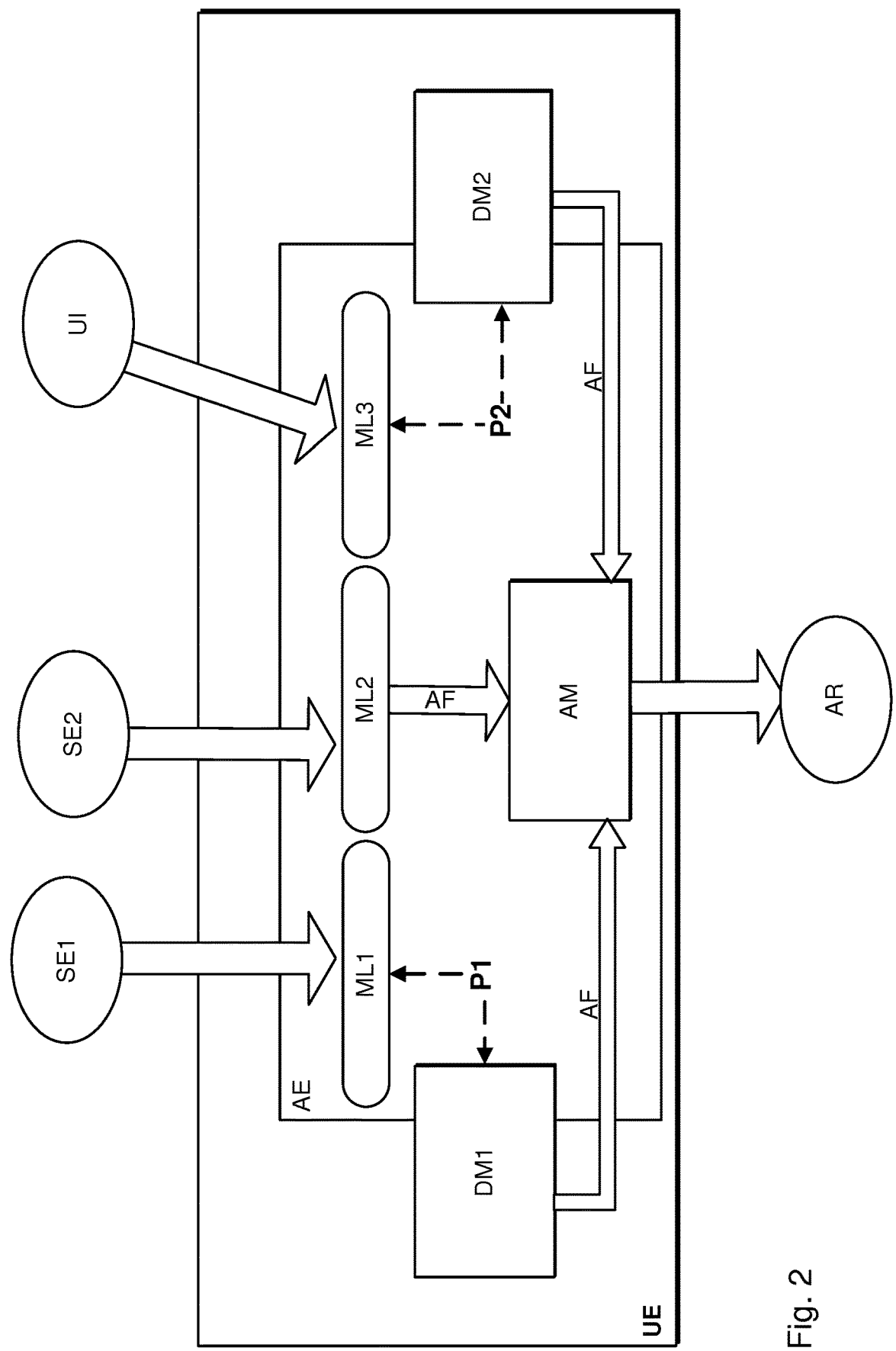
FIG. 2 represents a user equipment of the type to which the present invention is applied to as a second embodiment.

In FIG. 2 another preferred embodiment of the user equipment UE is presented. Here it is further taken into account the dynamic usage of authentication factors AF. Generally the setup is alike the one shown in FIG. 1. Additionally now the Machine learning engines ML1 and ML3 take into account validity indications P1, P2 relating to validity periods of the respective authentication factor, which lead to the dynamic models DM1 and DM2.

In particular dynamic model DM1 relates to the passive learning mode, by means of sensors SE1, SE2, while dynamic model DM2 relates to active learning mode through the user interface UI.

In regular intervals the dynamic model DM1 provides its ephemeral authentication factors AF to the local authentication model AM, taking into account the validity period of the stored validity indication P1, P2. That means, when the validity period of an authentication factor is active, the dynamic authentication factor is provided to the authentication model. Once the validity period expires, the update from the dynamic model DM1 to the local authentication model AM indicates to delete said dynamic authentication factor, as it is not to be considered anymore by the authentication engine AE. Through the user interface e.g. an question is answered relating to the day, e.g. "what did you eat today". The answer may be stored as authentication factor AF in the local authentication model AM, but through the dynamic model DM2 this is enhanced with a validity indication P2. In this case the validity period of this question is through the context valid until the end of the day. When for getting access to the user equipment a user is asked to enter what he ate that day, he could give an answer. If the answer is correct can only be checked against the previously stored authentication factor at the same day. The check results in an authentication result AR, which has basically the different outcomes: "Yes" and "No".

The authentication factor is not supposed to be valid anymore at the next day. Hence through a regular update from the dynamic model it would be deleted from the authentication model. This authentication model is hence called an ephemeral model. Asking the same question again and getting the same answer again would at the following day consequently not lead to a successful authentication. Preferably however the question is only asked for authentication when an authentication factor with that information for the current day is present.

Generally the same happens with the passive learning mode where the sensor SE1 delivers behaviour input which is enhanced with a validity indication P1 from dynamic model DM1. This relates in particular to a time limited sensorial detectable behaviour, like the way the user walks, while his broken leg is in a cast, through at least one of the sensors SE1, SE2.

Figure 3:
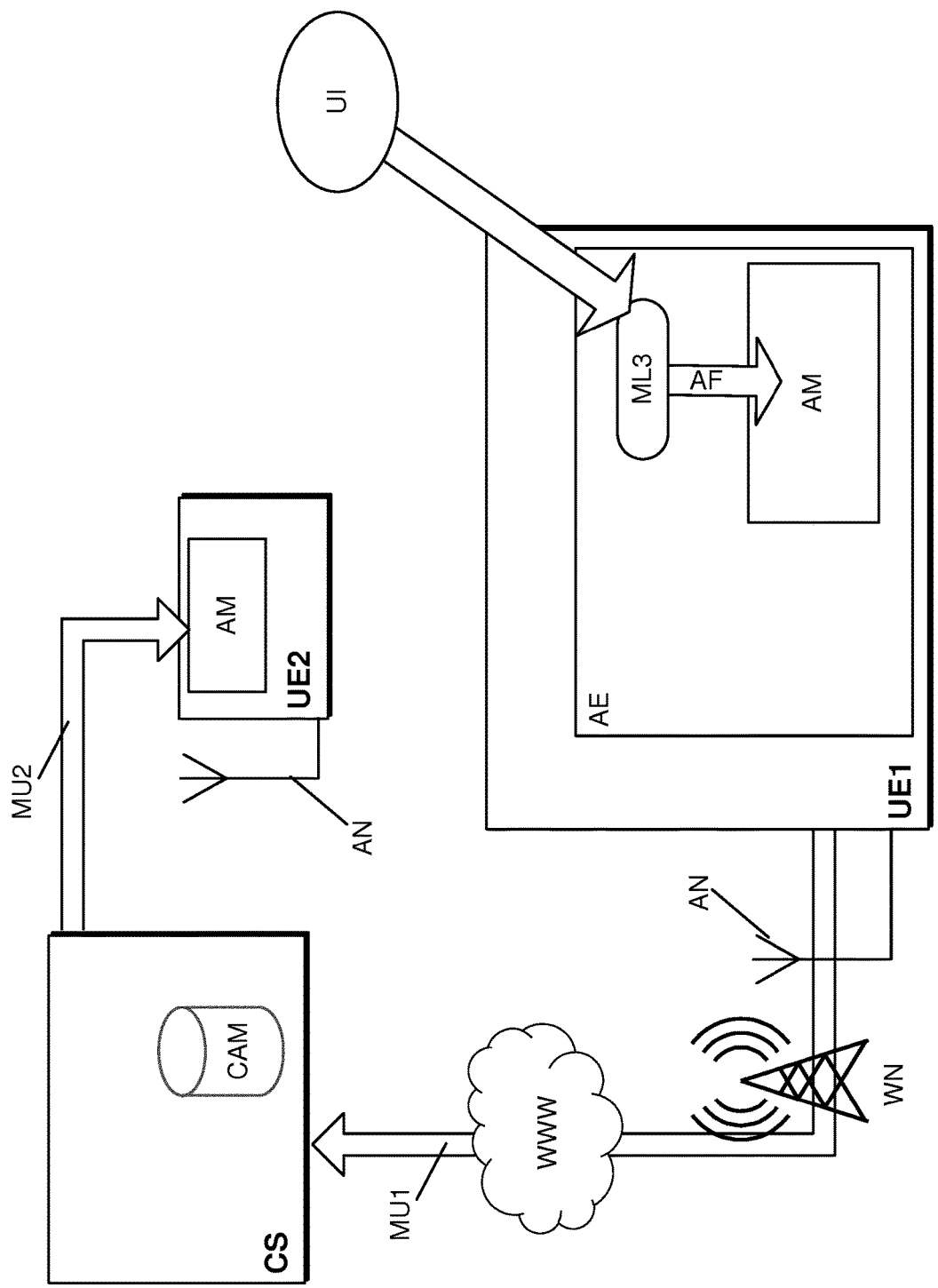
FIG. 3 shows a user equipment and a central server of the type to which the present invention is applied to as a third embodiment.

The authentication factor with a validity indication is likewise stored in the authentication model and can be used to retrieve an authentication results AR. FIG. 3 shows the situation of a first user equipment UE1 of a user who owns one or more other user equipment UE2, where he wants to get access to in the same way. The user equipments UE1, UE2 in this example do not differ in their inner structure, however they can be differently, like smartphones, tablets, fitness gear etc.

The user equipments UE1, UE2 are further equipped with communication means in this exemplifying figure indicated by the antenna AN. With the help of this antenna—and of course more communication circuitry (not shown)—the user equipment is capable to establish a communication channel via a wireless network CN and the Internet WWW to a central server CS which holds a central authentication model CAM. The wireless network may in particular be a cellular network, a Wi-Fi hotspot/network, usage of Wimax, NFC, Bluetooth, LoraWan etc.

With each enhancement of the local authentication model AM by adding an authentication factor AF, if equipped with a validity indication or not, the user equipment sends through the communication channel a model update message MU1 to the central server.

The central server is configured to process this model update message MU1 and enhances its central authentication model CAM. The central authentication model is in particular a replication of the local authentication model AM of the user equipment UE1.

As a result of the enhancement of the central authentication model CAM, the central server CS triggers a transmission of a second model update message MU2 to another user equipment UE2, which likewise is configured to establish a communication channel to the central server. This user equipment belongs to the set of user equipment belonging to the same user. The authentication factor, which triggered the first model update message is also initiated by a user interaction of the same user.

Hence the central server CS only causes an update on the local authentication models assigned to that user for those user equipments owned by the user.

Should the same user equipment be used by a different user, then a separate local authentication model AM is available, either in the same data structure or separately.

Eventually the local authentication model of the first user equipment UE1 has the same content as the local authentication model of the second user equipment UE2 for the same user, hence the user can get access to both user equipments by the same way. Preferably a learning step at the second user equipment UE2 would cause the same procedure in the other direction in order to synchronize the local authentication model AM of both user equipments UE1, UE2 again.

Figure 4:
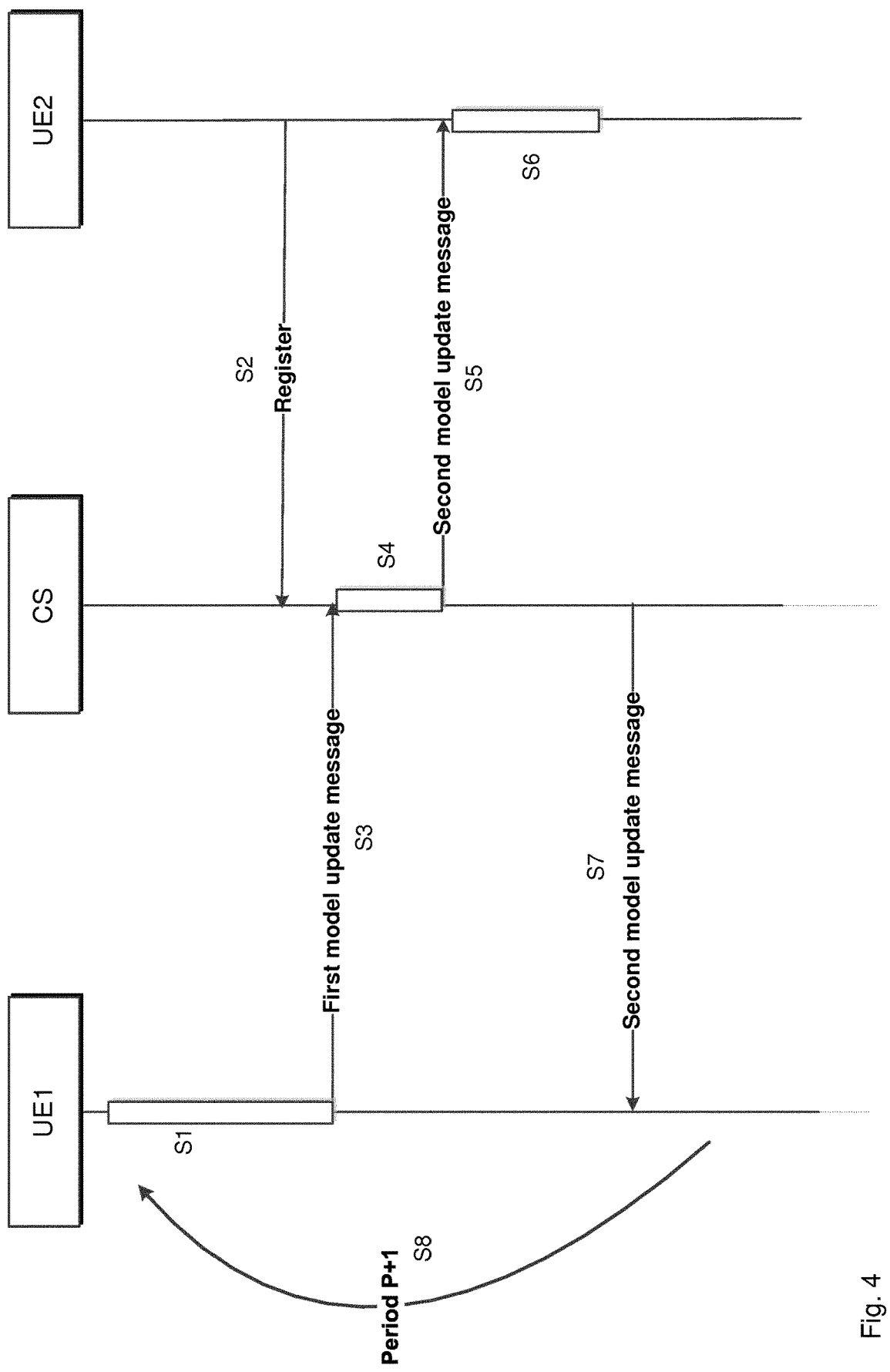
FIG. 4 shows a sequence diagram of another embodiment of the inventive method.

This propagation of authentication model data is shown in a sequence diagram of FIG. 4. It covers the two user equipments UE1 and UE2 of the same user and the central server CS holding a central authentication model CAM for that user. User equipment UE1 and UE2 are communicatively coupled with the central server and thus able to exchange signalling messages.

The exemplifying method starts with the first user equipment UE1, which is supposed to check its local authentication model in step S1. The user equipment comprises in particular a dynamic model, which is equipped with a validity indication P1, which might lead to a change of the local authentication model once the validity period expires.

The second user equipment UE2 belongs to the same user. For making this known to the central server CS it sends a register message S2, indicating the user it belongs to the central server. Preferably this is part of the initialization of the user equipment carried out by the user.

The central server memorizes this information locally in a user equipment register in conjunction with some user data, like an identifier. After receiving the register message in step S2, the central server has a relationship of user equipment UE1 and user equipment UE2 with that specific user.

When the local authentication model of user equipment UE1 is enhanced by at least one authentication factor AF it is send with a first model update message in step S3 to the central server CS. The model update message at least comprises a user identification, and information relating to the changed at least one authentication factor. Preferably also an indication of the user equipment UE1 itself, e.g. a IMEI or any other permanent identifier is also provided.

Preferably all communication between the user equipments UE1, UE2 and the central server is secured e.g. by signature with a certificate issued by the central server.

The central server CS in response to receiving the first model update message handles the content of the received message in step S4 and carries out an update of the central authentication model.

Further it checks in conjunction with this update if another user equipment is supposed to be informed by this change. For this the user equipment register of the central server is monitored. If at least one user equipment different from the sending user equipment is stored in the register, then the central server is supposed to send a second model update message to this at least one user equipment.

As this is the case in this situation, in step S5 the second model update message is sent to the user equipment UE2. The second model update message at least comprises information relating to the changed authentication factor.

The user equipment UE2 handles in step S6 the received second model update message and carries out an update on its local authentication model. Preferably the central server also sends a second model message to the first user equipment UE1 as well. In this case this is done by sending another model update message in step S7. This is sufficient for the user equipment to consider the first model update message sent in step S3 as acknowledged. After a given period P1, at the user equipment UE1 it is branched in step S8 again to check if a change of the local authentication model took place, in order to decide if another model update message is about to be sent (step S1 again). This decision also takes into account if a validity period of an authentication factor did expire. This would according to FIG. 3 lead to an update of the local authentication model from one of the dynamic models. Hence the change of local authentication model triggers sending another model update message.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method for authentication of a user using a user equipment, comprising an authentication engine for authenticating at least one user, said authentication engine being configured to operate with a local authentication model, wherein the method comprises the step for the user equipment of enhancing its local authentication model by at least one authentication factor; wherein said at least one authentication factor is stored in the local authentication model with a validity indication, indicating a time the at least one authentication factor is valid for taking into account by the authentication engine, wherein the authentication engine detects temporary modification of user behavior over said predefined period from said validity indications derived from a user input, a predefined default value, and context derivation over a special time, associated with said user behavior; and authenticating a user by means of a match of the local authentication model with a set of user behavior indications retrieved by the user equipment through the authentication engine; wherein, the user equipment further comprising a communication unit for communicating with a central server comprising a central authentication model used for said authentication engine; for providing a first model update message relating to said at least one authentication factor of the local authentication model to the central server, being configured to update the central authentication model based on said first model update message;

retrieving a second model update message from the central server, relating to an update of the central authentication model, said update relating to at least one model update message provided by at least one second user equipment; and enhancing the local authentication model based on the second model update message, wherein the user equipment and the at least one second user equipment belong to the same user, and upon expiration of a predefined period, checking if a change of said local authentication model takes place in order to decide if another model updated message is about to be sent, wherein the step of checking comprises determining if said validity indication of said at least one authentication factor has expired.

2. The method according to claim 1, comprising after expiry of the predefined period the step of searching at least one authentication factor with expired validity indication in the local authentication model, removing the at least one found authentication factor from the local authentication model.

3. The method according to claim 1, wherein the authentication engine comprises a plurality of machine learning patterns, comprising in authenticated mode an active machine learning pattern for collecting authentication factors relating to a user interaction, and a passive machine learning pattern for collecting authentication factors by retrieving information through sensors of the user equipment.

4. The method according to claim 1, wherein said at least one authentication factor comprises at least one out of:
one of the latest user equipment used by the user,
one of the last location the user was situated at,
one of the last persons the user interacted with,
recently determined data retrieved by at least one sensor accessible by the user equipment,
an answer to a question provided through the user equipment.

5. The method according to claim 1,
wherein the validity indication of said at least one authentication factor is amended in case a second authentication factor impacting the first authentication factor is determined.

6. The method according to claim 1,
wherein, the user equipment further comprising the communication unit for communicating with the central server comprising the central authentication model used for said authentication engine.

7. A user equipment, comprising an authentication engine for authenticating at least one user, said authentication engine being configured to operate with a local authentication model, wherein the user equipment is configured to enhance its local authentication model by at least one authentication factor, wherein said at least one authentication factor is stored in the local authentication model with a validity indication, indicating a time the at least one authentication factor is valid for taking into account by the authentication engine, and further the user equipment is configured to authenticate a user by means of a match of the local authentication model with a set of user behavior indications retrieved by the user equipment through the authentication engine, wherein the authentication engine detects temporary modification of user behavior over said predefined period from said validity indications derived from a user input, a predefined default value, and context derivation over a special time, associated with said user behavior:

the user equipment further comprising a communication unit for communicating with a central server comprising a central authentication model used for said authentication engine, wherein the user equipment is configured to:

provide a first model update message relating to said at least one authentication factor of the local authentication model to the central server, being configured to update the central authentication model based on said first model update message;

retrieving a second model update message from the central server, relating to an update of the central authentication model, said update relating to at least one model update message provided by at least one second user equipment;

and enhancing the local authentication model based on the second model update message;

wherein the user equipment and the at least one second user equipment belong to the same user, and upon expiration of a predefined period, checking if a change of said local authentication model takes place in order to decide if another model updated message is about to be sent, wherein the step of checking comprises determining if said validity indication of said at least one authentication factor has expired.

8. The user equipment according to claim 7, further comprising at least one sensor, wherein the authentication engine comprises a plurality of machine learning patterns, comprising in authenticated mode an active machine learning pattern for collecting authentication factors relating to a user interaction, and a passive machine learning pattern for collecting authentication factors by retrieving information through said sensors of the user equipment.

9. The user equipment according to claim 8, wherein the validity indication of said at least one authentication factor is amended in case a second authentication factor impacting the first authentication factor is determined.

10. The user equipment according to claim 7, the user equipment further comprising the communication unit for communicating with the central server comprising the central authentication model used for said authentication engine.

11. The user equipment according to claim 10, further configured after expiry of the predefined period to:

search at least one authentication factor with expired validity indication in said local authentication model, remove said at least one found authentication factor from the local authentication model, provide a first model update message relating to the removed authentication factor to the central server.

* * * * *